United States Patent
Yu et al.

(10) Patent No.: US 12,519,420 B1
(45) Date of Patent: Jan. 6, 2026

(54) PURLIN, PURLIN ASSEMBLY AND PHOTOVOLTAIC BRACKET

(71) Applicant: Changzhou Arctech Solar New Energy Technology Co., Ltd, Jiangsu (CN)

(72) Inventors: Zhengming Yu, Jiangsu (CN); Guangsheng Shen, Jiangsu (CN); Meng Chen, Jiangsu (CN)

(73) Assignee: Changzhou Arctech Solar New Energy Technology Co., LTD, Jiangsu (CN)

( * ) Notice: Subject to any disclaimer, the term of this patent is extended or adjusted under 35 U.S.C. 154(b) by 0 days.

(21) Appl. No.: 19/229,016

(22) Filed: Jun. 5, 2025

(30) Foreign Application Priority Data

Apr. 24, 2025 (CN) .......................... 202520795476.2

(51) Int. Cl.
*H02S 30/10* (2014.01)
(52) U.S. Cl.
CPC .................................. *H02S 30/10* (2014.12)
(58) Field of Classification Search
CPC ................................. H02S 30/10; H02S 20/32
See application file for complete search history.

(56) References Cited

U.S. PATENT DOCUMENTS

| | | | |
|---|---|---|---|
| 2020/0153382 A1* | 5/2020 | Ballentine | F24S 25/636 |
| 2021/0273603 A1* | 9/2021 | Almy | F24S 25/617 |
| 2021/0297037 A1* | 9/2021 | Dally | F16M 11/10 |
| 2024/0396490 A1* | 11/2024 | Sable | F24S 30/425 |
| 2025/0007448 A1* | 1/2025 | Cherukupalli | H02S 20/30 |
| 2025/0047236 A1* | 2/2025 | Yadlapalli | F24S 30/425 |

* cited by examiner

Primary Examiner — Jayne L Mershon
(74) Attorney, Agent, or Firm — Woodard, Emhardt, Henry, Reeves & Wagner, LLP

(57) ABSTRACT

Purlins, purlin assemblies and photovoltaic brackets are disclosed. The purlin assembly comprises a purlin and two clamps. The purlin comprises two first plates and a second plate forming a receiving groove, where the clamps are pivoted via pre-installation rivets. One side of the purlin and the clamps jointly fasten a main shaft. The other side connects to photovoltaic modules. The purlin comprises a central region and two end regions. In the central region, the second plate and the receiving groove form convex shapes wider at center. Uniform load transfer and structural rigidity are achieved through surface fitting and rigid-flexible coupled force transmission. The reinforcing protrusion at the purlin's center, combining optimized diagonal force transmission, disperses dynamic loads. With pre-installation rivets and pivoted clamps, high-precision pre-installation and modular pivoting structure are achieved, facilitating non-destructive disassembly-assembly, robot gripping and automated construction.

19 Claims, 11 Drawing Sheets

PURLIN, PURLIN ASSEMBLY AND PHOTOVOLTAIC BRACKET

FIELD OF THE DISCLOSURE

The present application relates to the technical field of photovoltaic equipment, and in particular to a purlin, a purlin assembly and a photovoltaic bracket.

BACKGROUND

With the rapid development of photovoltaic power technology, photovoltaic brackets, as the core supporting structure of photovoltaic modules, have become the focus of industry attention. Since the purlins in the photovoltaic bracket are in direct contact with the photovoltaic modules, their structure must take into account factors like load-bearing capacity, cost, and installation convenience.

The prior art provides various photovoltaic brackets and components. For example, US patent published as U.S. Pat. No. 11,527,988B2 discloses a mounting bracket assembly. Referring to its FIGS. 8B-8D and column 7, lines 37-46 of the specification, it comprises a first extension panel, a first clamp, a main body, a second clamp and a second extension panel. A single bolt passes through the first extension panel, the first clamp, the main body, the second clamp and the second extension panel to fasten these parts. However, its structure is complex, the installation efficiency low, the production cost high, and it is difficult to implement automated installation.

US patent published as U.S. Pat. No. 12,074,559B2 discloses a photovoltaic module mounting system. Referring to its specification, column 5, lines 23-54 and FIGS. 1A-1C, it includes a module clamp and a torque tube band coupled to the module clamp, wherein one or more ends of the module clamp are wider than the central portion of the module clamp. However, in this technical solution, the ends of the module clamp are shorter than the central portion, so that the central portion has a narrower but higher profile than opposite ends. When the photovoltaic module is installed on the photovoltaic module mounting system, the torque tube clamp applies a large stress to the central portion of the module, resulting in insufficient bearing strength of the central portion. The central portion of the module should be structurally reinforced.

SUMMARY OF THE INVENTION

In view of the deficiencies of the prior arts, the present application provides a purlin assembly to solve the technical problem of not having optimal bearing capacity, especially at the central region of the purlin assembly under low-cost design.

To achieve the above objectives, the present application is implemented through the following technical solutions.

The first aspect of the present application relates to a purlin assembly for fixing photovoltaic modules to a main shaft, comprising a purlin which comprises two first plates and one second plate; wherein the second plate extends as a whole along a first direction and has width in a second direction, and the two first plates extend respectively from two edges of the second plate in the second direction to a first side of the second plate, thereby forming a receiving groove together with the first plate, wherein the second plate is adapted to connect with the photovoltaic modules; and further comprising a fixing device, which is arranged in the receiving groove at one end close to the purlin, and the fixing device is adapted to enclose and fix the main shaft together with at least part of the purlin.

The purlin comprises a central region and two end regions located on opposite sides of the central region along the first direction. In the central region, the second plate constitutes a convex shape that is wider at the center than at two ends, and in a cross-section parallel to the first direction and the second direction, the two first plates also constitute a convex shape that is wider at the center than at two ends.

Another aspect of the present application relates to a purlin for fixing photovoltaic modules to a main shaft, which comprises two first plates and one second plate; wherein the second plate extends as a whole along a first direction and has width in a second direction, and the two first plates extend respectively from two edges of the second plate in the second direction to a first side of the second plate, thereby forming a receiving groove together with the first plate, wherein the second plate is adapted to connect with the photovoltaic modules; and the receiving groove is adapted to receive an end of a fixing device close to the purlin, so that a part of the purlin and the fixing device jointly enclose and fix the main shaft; wherein the purlin comprises a central region and two end regions located on opposite sides of the central region along the first direction; and in the central region, the second plate constitutes a convex shape that is wider at the center than at two ends, and in a cross-section parallel to the first direction and the second direction, the two first plates also constitute a convex shape that is wider at the center than at two ends.

Another aspect of the present application relates to a photovoltaic bracket, comprising a plurality of columns, a plurality of column top seats, a plurality of bearing assemblies and a main shaft, wherein the plurality of columns are installed in a one-to-one correspondence with the plurality of column top seats, and the plurality of bearing assemblies are installed in a one-to-one correspondence with the plurality of column top seats, and the main shaft passes through the plurality of bearing assemblies; and further comprises the purlin assembly described in any of the aforementioned embodiments, wherein the plurality of purlin assemblies are installed on the main shaft at intervals along the extension direction of the main shaft, and two adjacent purlin assemblies are adapted to support a photovoltaic module.

The present application and its embodiments have at least one of the following beneficial technical effects.

1. The central region of the purlin adopts convex shapes such as shuttle-shaped structures to disperse dynamic loads in multiple directions, reducing the risk of stress concentration, and improving the bearing capacity of the purlin.

2. The contoured enclosing configuration of the clamps matches the curved surface of the photovoltaic main shaft, increasing the contact area. And together with the high-strength stamped steel structure of the purlins, a uniform load transfer is achieved and anti-deformation performance is improved.

3. The configuration of pre-installation rivets and hinged clamps enables high-precision assembly before leaving the factory. Only bolt tightening is required on site to reduce human errors. The clamps adopt a modular opening and closing structure, support non-destructive disassembly-assembly and robot gripping interface, and are suitable for automated construction.

4. The entire purlin and clamps are formed using stamping processes to ensure structural consistency. They also incorporate a pre-installation mechanism for reliable connections and feature an adjustable interface to accommodate future extensions. Together, these elements create an integrated technical loop encompassing design, installation, and maintenance.

5. Through contour optimization, the inner surfaces of the clamps and the abutting surface of the purlin are configured to match the shape of the main shaft to improve the installation stability. Combined with topological mechanical reconstruction, the clamps can transmit forces diagonally. In addition, such a structure is compatible with intelligent installation, which solves the contradiction between stability, bearing capacity and construction efficiency in the case of traditional purlin structures, and provides a standardized and highly reliable connection solution for the construction of photovoltaic power stations in harsh environments such as areas with high altitude and strong wind.

BRIEF DESCRIPTION OF THE DRAWINGS

The preferred embodiments will be described below in a clear and understandable manner in conjunction with the accompanying drawings to further illustrate the above characteristics, technical features, advantages and implementation methods of the present application. The preferred embodiments are given as examples only, without limiting the present application.

Figure 1:
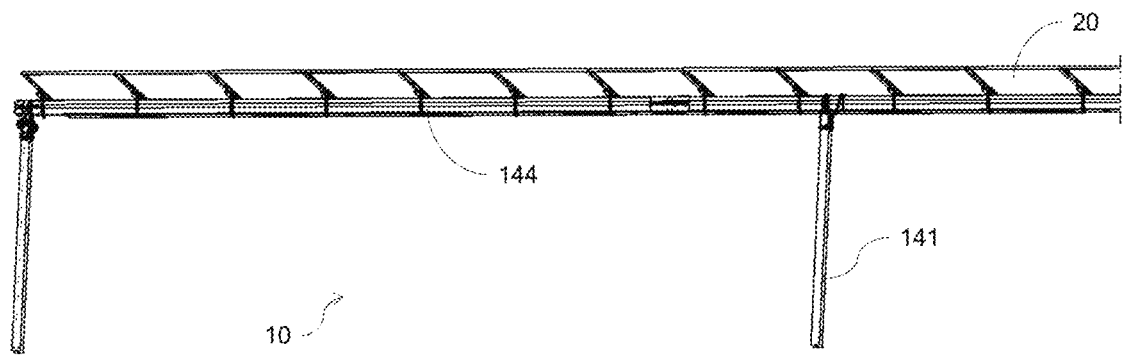
FIG. 1 is a schematic partial perspective view of a photovoltaic bracket embodiment.

Description of reference labels. 10: photovoltaic bracket, 20: photovoltaic module, 100: purlin assembly, 110: purlin, 111: first plate, 112: second plate, 113: receiving groove, 114: central region, 115: end region, 116: third plate, 117: reinforcing rib, 118: connecting region, 119: flange, 120: clamp, 121: connecting portion, 122: matching portion, 123: locking portion, 124: bottom wall, 125: wing, 126: open groove, 128: contracted portion, 129: positioning cavity, 131: pre-installation rivet, 132: bolt, 133: nut, 141: column, 142: column top seat, 143: bearing assembly, 144: main shaft, 147: plane segment, 148: arc segment, 1121: groove, 1122: elongated hole, 1161: abutting surface, 1241: through hole, H1: first height, H2: second height, H3: third height, L1: first length, L2: first distance, L3: second distance, W1: first width, W2: second width, W3: third width, W4: fourth width, W5: fifth width, X-X': first direction, Y-Y': second direction, Z-Z': third direction, D: first side; S: installation space.

DESCRIPTION OF THE ILLUSTRATED EMBODIMENTS

To clearly illustrate the embodiments of the present application or the prior arts, specific embodiments of the present application will be described below with reference to the accompanying drawings, which are only some embodiments of the present application. For technicians, other drawings and other embodiments can be obtained based on these drawings without creative work.

To make the drawings concise, only parts related to the present application are schematically shown in each figure, and they do not represent the actual structure of products. In some figures, only one of the parts with the same structure or function is schematically shown or labeled. In this article, "one" not only means "only one", but may mean "more than one". The term "and/or" used in the specification of this application and the attached claims refers to any combination of one or more of the associated listed items, and includes these combinations. The terms "first", "second", etc. are only used to distinguish the description and are not indicating or implying relative importance.

Unless otherwise clearly specified and limited, the terms "installed", "connected", and "connected" should be understood in a broad sense. For example, it can be a fixed connection, a detachable connection, an integral connection, a mechanical connection, an electrical connection, a direct connection, an indirect connection through an intermediate medium, or internal communication of two components. For technicians, the specific meanings of the above terms in this application can be understood according to specific circumstances.

In the drawings, underlined reference numerals indicate illustrated assemblies. Reference numerals plus short curved lines without arrows indicate physical components or structures; reference numerals plus short curved lines with arrows indicate geometric features of non-physical structures or physical structures, such as recesses, through holes, grooves, surfaces, etc. Brackets indicate the scope of local structures or regions. Double-dotted lines indicate structural boundaries of local structures, virtual component outlines, or indicate directions. Guide lines plus arrow lines and reference labels indicate dimensions.

In FIG. 1, photovoltaic modules 20 are usually installed on a photovoltaic bracket 10, and the photovoltaic bracket 10 includes a plurality of columns 141 installed on the ground or on a structure, and a main shaft 144 is installed on the columns 141. The main shaft 144 is adapted for driving the photovoltaic modules 20 to rotate and receive sunlight effectively. The present application relates to a purlin assembly 100 for installing the photovoltaic modules 20 on the main shaft 144.

Figure 2:
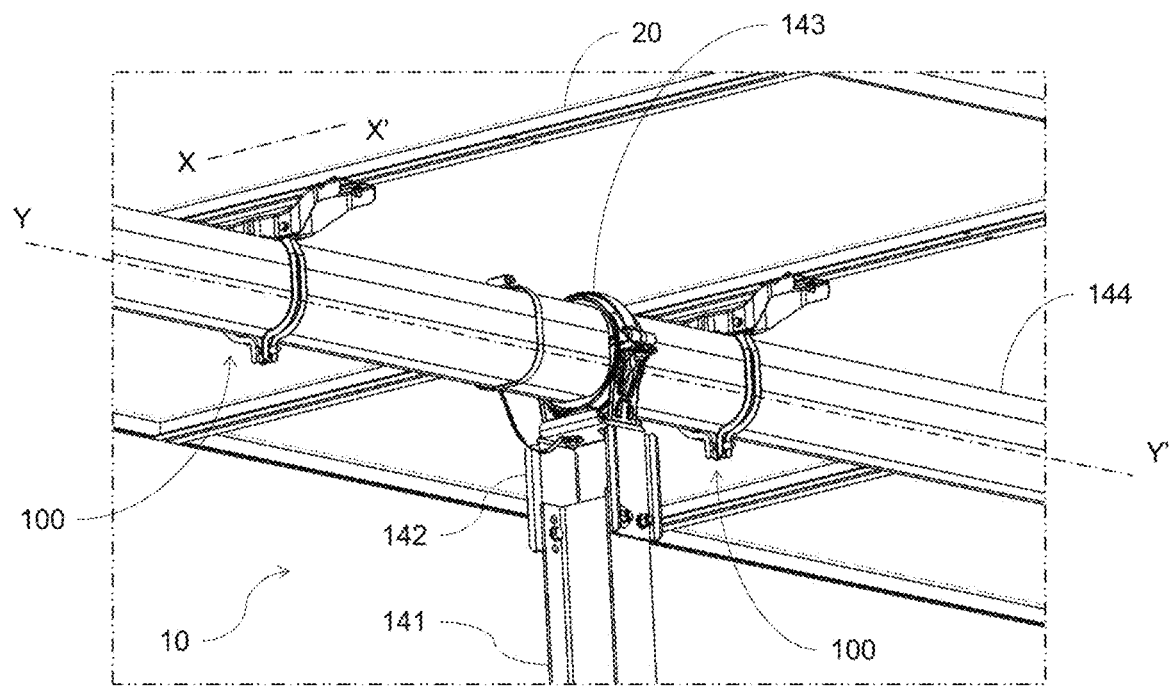
FIG. 2 is a partial perspective view of the embodiment in FIG. 1 from another angle.

In FIG. 2, the photovoltaic modules 20 are generally plate-shaped and extends along a first direction X-X' and a second direction Y-Y'. The main shaft 144 extends along the second direction Y-Y'. In addition to the main shaft 144 and the purlin assembly 100, the photovoltaic bracket 10 generally includes a plurality of columns 141, a plurality of column top seats 142, and a plurality of bearing assemblies 143. The plurality of columns 141 are installed one-to-one with the plurality of column top seats 142, and the plurality of bearing assemblies 143 are installed one-to-one with the plurality of column top seats 142, and the main shaft 144 passes through the plurality of bearing assemblies 143. Specifically, each bearing assembly 143 includes a bearing seat and a bearing, wherein the bearing is rotatably arranged in the bearing seat, and the main shaft 144 passes the center hole of the bearing to complete the installation.

A plurality of purlin assemblies 100 are installed between the main shaft 144 and the photovoltaic modules 20 at intervals along the second direction Y-Y', and one photovoltaic module of the photovoltaic modules 20 can be supported between two adjacent purlin assemblies 100. In this way, the purlin assemblies 100 fix the photovoltaic modules 20 to the main shaft 144. They can be driven by the main shaft 144 to achieve rotation around an axis in the second direction Y-Y'. The main shaft 144 is usually a torque tube, and a torque is applied to the photovoltaic modules 20 through the purlin assembly 100 to rotate it.

Conversely, when resisting wind loads, the purlin assemblies 100 need to bear the pressure and other dynamic loads from the photovoltaic modules 20, and transfer these to the main shaft 144. Whether in operation that the main shaft 144 drives and rotates the photovoltaic modules 20, or operation of resisting wind loads, or even a combination thereof, complex stress distribution may be generated inside the purlin assembly 100, and stress concentration may occur locally, thereby increasing fatigue load and increasing failure risks in long-term use.

Since the purlin assembly 100 is fixed to the photovoltaic modules 20 and rotate therewith, it not only needs to provide reliable connection rigidity to avoid deformation under the weight of the photovoltaic modules 20 and wind loads, but also needs to be lightweight in structure to reduce costs.

Further, since the photovoltaic bracket 10 are usually installed extensively, high installation efficiency is required. Recently, automated installation has developed rapidly. If the photovoltaic bracket 10, especially the purlin assembly 100, is adapted to facilitate gripping and fixing by installation robots, installation cost can be significantly reduced.

In each embodiment, the above requirements on the load-bearing capacity and lightweight of the purlin assembly 100 are first considered, and then targeted configurations are made for installation convenience, installation accuracy, and adaptability to automated installation.

Figure 3:
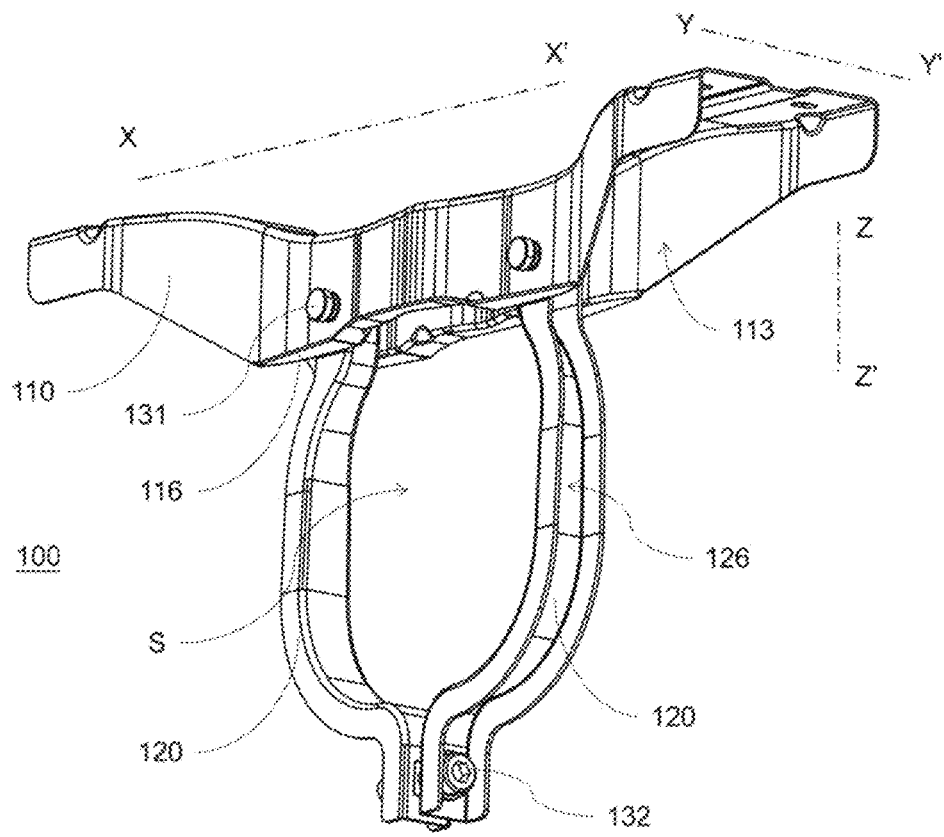
FIG. 3 is a perspective view of a purlin assembly embodiment.
Figures 15, 16:
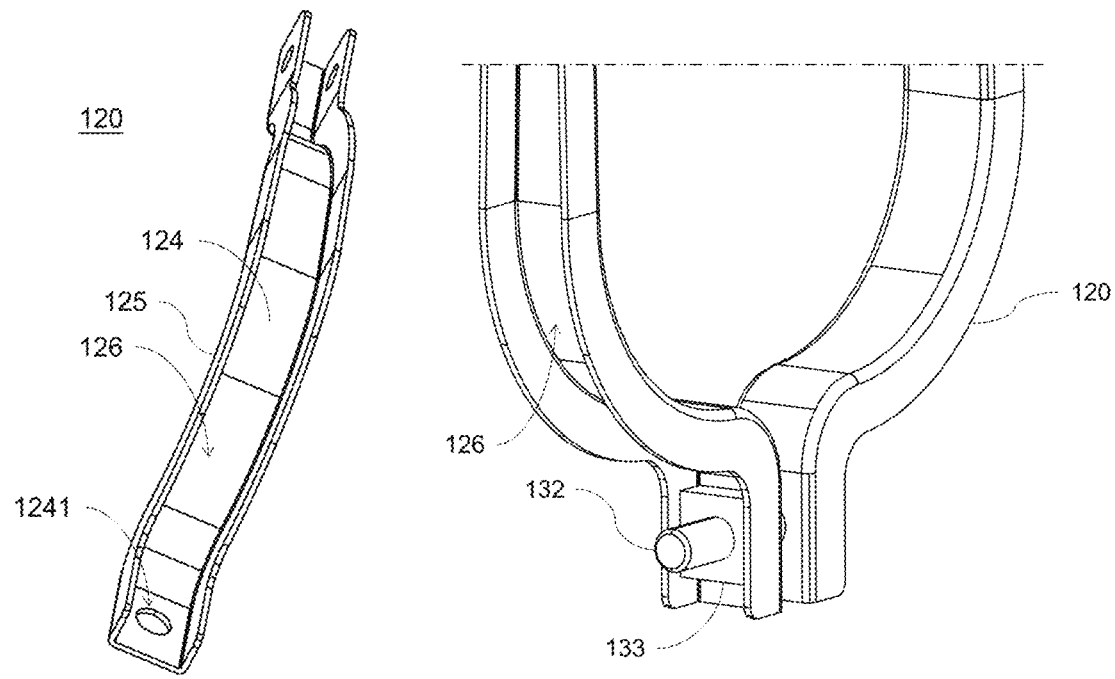
FIG. 15 is a perspective view of the clamp in FIG. 13.
FIG. 16 is a partial perspective view of the embodiment in FIG. 3 from another angle.

FIG. 3 shows a perspective view of a purlin assembly 100 in FIG. 2. In FIG. 2, purlin assemblies 100 fixes the photovoltaic modules 20 to the main shaft 144. The purlin assembly 100 of this embodiment comprises a purlin 110 and two clamps 120, and a fastening set for securing the two clamps 120. The fastening set includes a bolt 132 and a nut 133 (see FIG. 16, FIG. 18B-18C). The two clamps 120 together form a hoop clamp (also called a fixing device in this application), one end of which is assembled to the purlin 110, and the other end fixed to the main shaft 144 via a fastening set such as a bolt 132 and a nut 133. In FIG. 3, the two clamps 120 and a portion of the purlin 110 enclose an installation space S, and the main shaft 144 is fixed therein.

Figure 4:
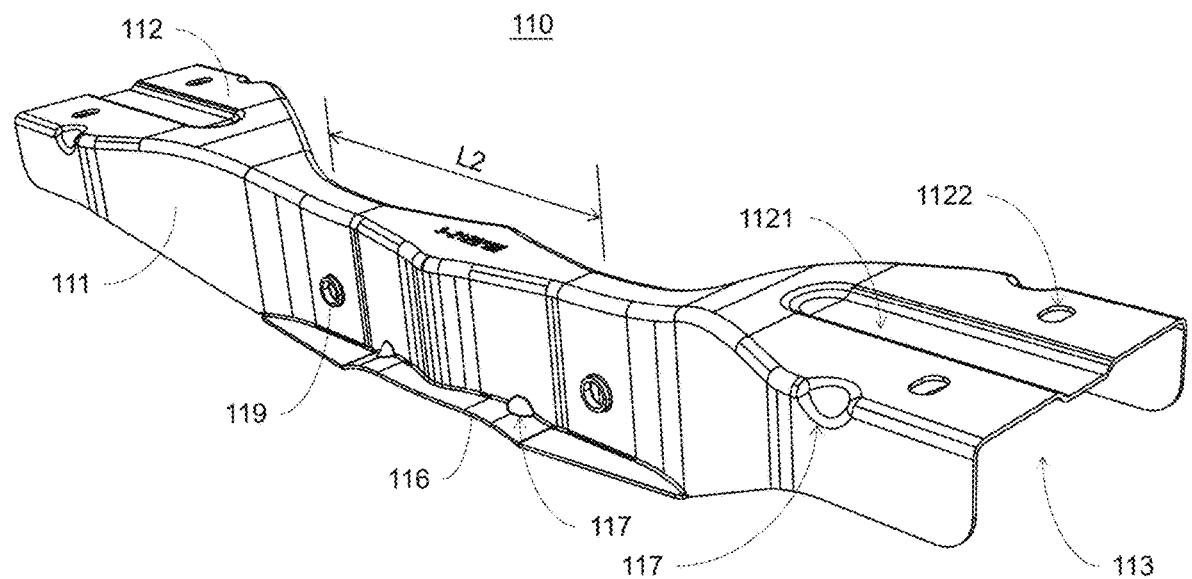
FIG. 4 is a perspective view of the purlin in the embodiment in FIG. 3.
Figure 21:
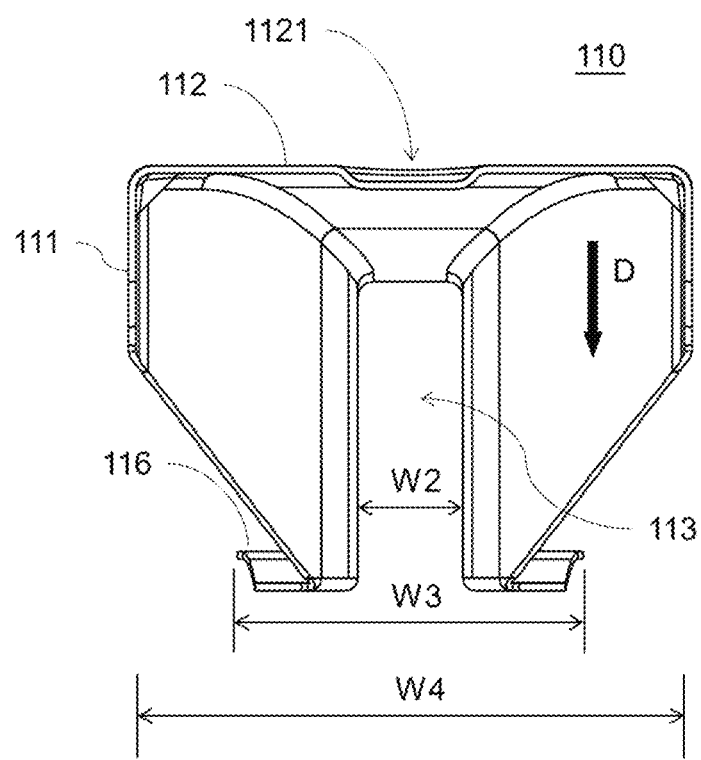
FIG. 21 is a side view of the purlin of the embodiment in FIG. 3.

In FIGS. 3-4, the purlin 110 includes two first plates 111 and a second plate 112. The second plate 112 extends as a whole along the first direction X-X', and the first direction X-X' is perpendicular to a second direction Y-Y' along which the main shaft 144 extends. The second direction Y-Y' is also the width direction of the second plate 112. The two first plates 111 extend respectively from two edges of the second plate 112 in the second direction Y-Y' to a first side D of the second plate 112. The direction of the first side D is shown in FIG. 21. In FIGS. 2-3, the first side D is below the second plate 112, and the two edges of the second plate 112 in the second direction Y-Y' are the two side edges of the second plate 112 in the width direction. Thus, a second plate 112 and two first plates 111 together constitute a receiving groove 113. The cross-section of the receiving groove 113 is U- or C-shaped. The second plate 112 is adapted to connect with the photovoltaic modules 20. Specifically, a second side thereof relative to the first side D is adapted to at least partially abut against the photovoltaic modules 20. In the figure, the second side is the upper surface of the second plate 112. This can also be observed in FIG. 2.

The receiving groove 113 is adapted to install a fixing device for fixing the main shaft 144. As described, in this embodiment, the fixing device comprises two clamps 120. However, in other embodiments, other fixing devices may be used to replace the two clamps 120. For example, a single clamp 120 integrally U-shaped may enclose and press the main shaft 144 (not shown in the figure) to the bottom of the purlin 110 along the third direction Z-Z' from below in FIG. 5, and the clamp 120 is fixed to the receiving groove 113 of the purlin 110 by fasteners such as rivets or bolts and nuts. In FIG. 3, the third direction Z-Z' is perpendicular to both the first direction X-X' and the second direction Y-Y'.

The embodiment in FIG. 5 may also be implemented in the following manner: a single clamp 120 is pivotally pre-installed to the purlin 110 via a pre-installation rivet 131 (see FIG. 3), and then fixed to a main shaft 144 (not shown in the figure) to buckle the purlin 110 to the main shaft 144, and its movable end is then fixed to the purlin 110 via a fastening set like a bolt and a nut.

In the embodiment of FIG. 3, the two clamps 120 are pivotally arranged in the receiving groove 113 by a pre-installation rivet 131. However, in other embodiments, the fixing device may also use two non-pivotally arranged clamps 120. For example, as observed in FIG. 3 and FIG. 4, the upper ends of the two clamps 120 may be fixed to the first plate 111, and the lower ends may be fixed to each other. So, based on the purlin 110 of the embodiment of FIG. 3, the fixing device may have various implementations, and together with the purlin 110 of the embodiment of FIG. 3 constitute the purlin assembly 100.

Figure 6A:
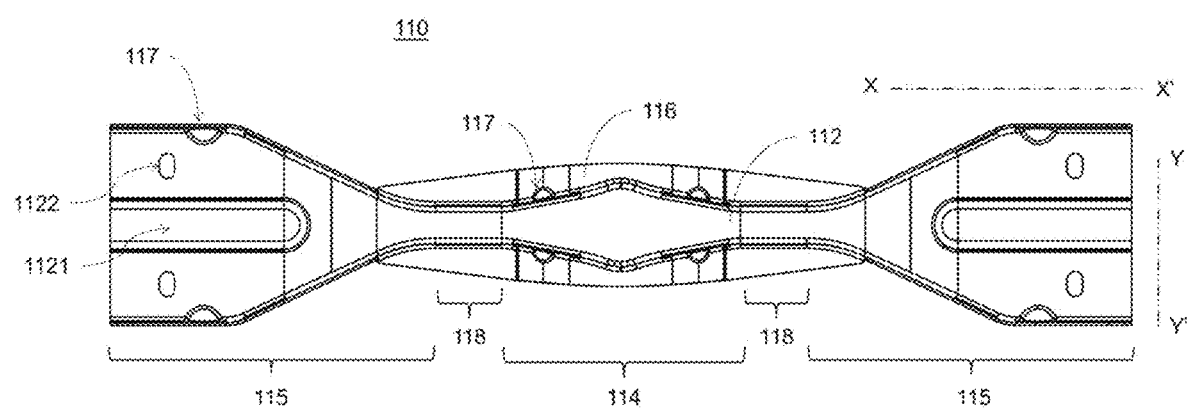
FIG. 6A is a top view of the purlin in the embodiment in FIG. 3.

Back to FIG. 3, and in FIG. 6A, the purlin 110 includes a central region 114 and two end regions 115 located on opposite sides of the central region 114 along the first direction X-X'. In the central region 114, the second plate 112 forms a convex shape wider at its center than at opposite ends. And in a cross-section perpendicular to the third direction Z-Z', i.e., parallel to the first direction X-X' and the second direction Y-Y', the two first plates 111 also form a convex shape wider at its center than at opposite ends (see FIG. 7H). Thus, the structure formed by the first plates 111 and the second plate 112 in the entire central region 114 is a convex shape wider at its center than at opposite ends. This can be intuitively understood in FIG. 6A, which is a top view of the purlin 110 observed along the third direction Z-Z' toward the main shaft 144.

Notably, in this article, when describing a two-dimensional or three-dimensional structure, rounded corners or transitional smooth edges can always be included in the overall structure. Technicians understand that they are required by actual production processes, such as stamping or die-casting. Ideal sharp corners or edges cannot actually be produced by simple stamping or die-casting, and have no benefit in most practical applications, and may even bring safety hazards and stress concentration. These rounded corners or smooth edges should not affect the overall description of the two-dimensional or three-dimensional structures in this article. For example, when a two-dimensional structure is described as a "rhombus", if the two-dimensional structure is actually a rhombus with rounded corners, it can still be called a "rhombus". This principle applies to other shapes or structures.

Since the purlin 110 in the central region 114 plays a key role in fixing the main shaft 144 and in transmitting torque, the central region 114 adopts a convex structure, including the second plate 112 and the receiving groove 113 formed by the second plate 112 and the two first plates 111 in the central region 114. In FIG. 6A, the convex structure is manifested in that the contours on opposite sides of the second plate 112 are convex curves. Assuming the first direction X-X' as X-axis and the second direction Y-Y' as Y-axis, each side of the contour constitutes a convex function curve, and at least a part thereof constitutes a strictly convex function curve. The definition of a convex function curve is that the average of function values at any two X-coordinates is less than or equal to any function value therebetween. The definition of a strictly convex function curve is that the average of function values at any two X-coordinates is less than any function value therebetween.

Examples of these convex function curves include the following curves or parts thereof: circular arcs, ellipses, trapezoids, shuttles, rhombuses, other polygons, parabolas, Gaussian curves, Bezier curves, racetracks (also called capsules or elongated circles), and combinations of parts thereof.

Specifically, taking the outer contour of the second plate 112 in the central region 114 from the perspective of FIG. 6A as an example, examples of the contour of the second plate 112 in the central region 114 formed by these convex curves are shown in FIGS. 7A-7G. Like in FIG. 6A, the left-right direction in these schematic diagrams is the first direction X-X', and the up-down direction the second direction Y-Y', which are no longer marked one by one in the figures. Further in FIG. 7H, in the C-C section (i.e. cross-section) shown in FIG. 9, the structure formed by the two first plates 111 also has a convex contour similar to FIG. 7A. Similarly, when the outer contours of the second plate 112 are respectively configured as FIGS. 7B-7G, the corresponding two first plates 111 also present convex contours similar to FIGS. 7B-7G in the C-C section.

Figure 7A:
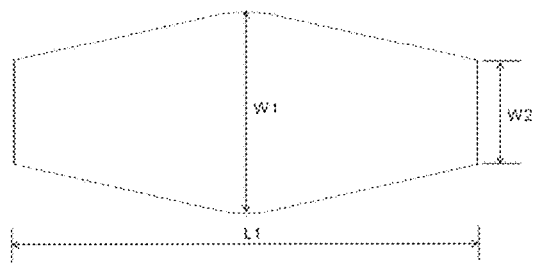
FIGS. 7A-7G are schematic diagrams of various contours of the second plate in the central region.
Figure 7B:
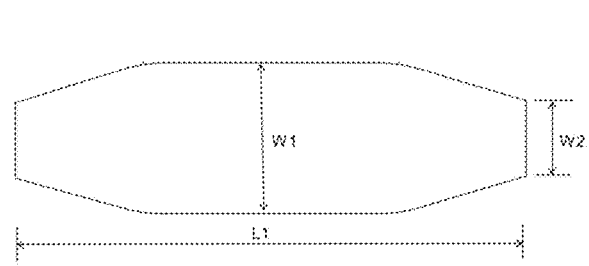
Figure 7C:
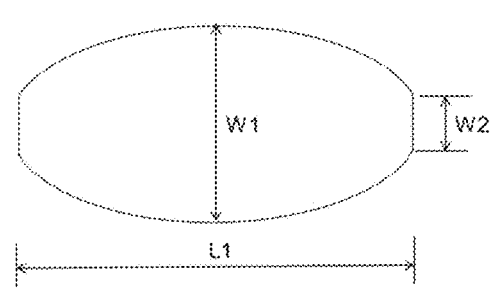
Figure 7D:
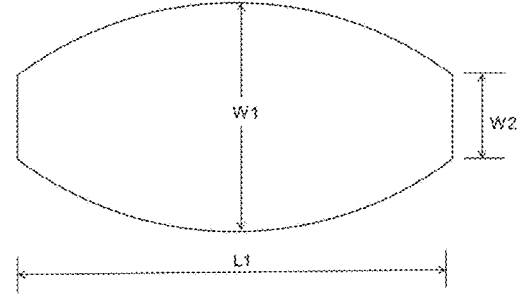
Figure 7E:
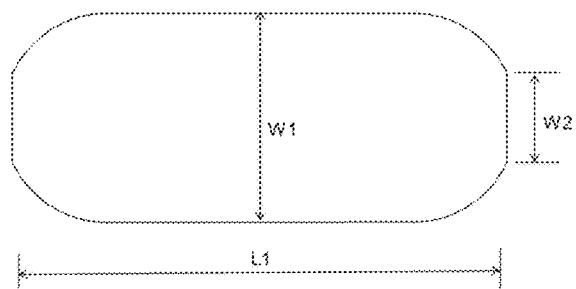
Figure 7F:
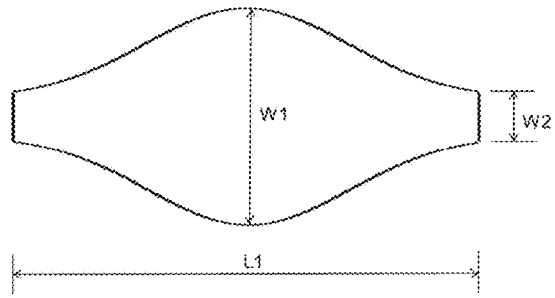

FIG. 7A shows a truncated rhombus profile. As mentioned, the profile includes rounded corners, without affecting our description of overall characteristics of the profile. This principle also applies to the following examples. The width of the profile decreases monotonically from a central position to two ends. The central width is the first width W1, the width at the left and right ends is the second width W2, and the left-right length is the first length L1. FIG. 7B shows a rectangular profile with trapezoidal narrowing at opposite ends. FIG. 7C shows a truncated ellipse. FIG. 7D shows a barrel shape with convex arcs on the sides. FIG. 7E shows a capsule shape with truncated ends. FIG. 7F shows a disk with Gaussian curves on opposite sides. A Gaussian curve is also called a normal distribution curve or a bell curve.

Not illustrated, polynomial curves such as parabolas and Bezier curves may also be adopted. Wherein Bezier curves are parametric polynomial curves commonly used in CAD and graphic design, which is essentially a combination of Bernstein polynomials, and has characteristics of flexibility, smoothness, and the ability to construct complex curves through multiple control points. The truncated shuttle in this application refers to a profile whose side curves are not shown in FIGS. 7A-7F, but meet the characteristics that the two sides are convex functions and the width at its center is greater than at two ends.

Figure 7G:
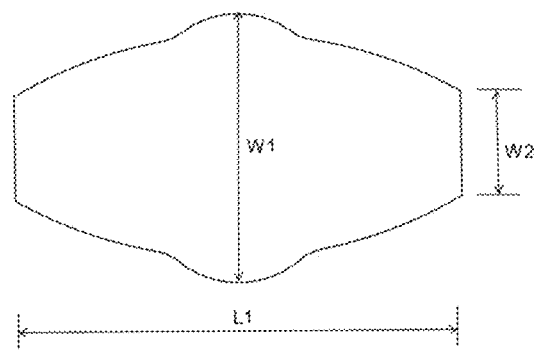
Figure 7H:
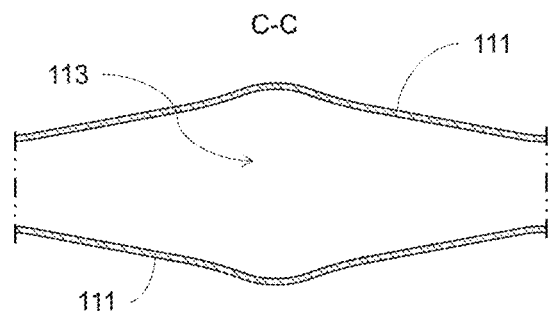
FIG. 7H is a partial C-C cross-section of FIG. 9.

The above-mentioned curves can be combined to form a composite convex shape. The combination may have two or more levels. For example, FIG. 7G shows a simple composite convex shape in which two arcs of different curvatures are combined to form a side contour. In addition to arcs, other suitable curves or parts of curves can also be combined, and curves with different parameters and different types can also be combined, and the combination can be transitioned by rounded corners. In fact, the two arcs in FIG. 7G are also transitioned by rounded corners with a smaller radius.

Thus, in the central region 114, the overall shape of the second plate 112 is one of the following shapes: a truncated shuttle, a truncated rhombus, a truncated ellipse, a rectangle with trapezoidal narrowing at opposite ends, a barrel with convex arc sides, a capsule with truncated ends, a disk with Gaussian curve sides, a composite convex shape with secondary protrusions on sides, etc.

The technical effect of the above shapes is that in the central region with the first width W1, the purlin 110 can fit the main shaft 144 with a larger width to obtain better support and less likely to deform and concentrate stress. Simultaneously, near the end regions 115, the width of the structure is reduced to the second width W2, which can provide better structural rigidity for the installation of fixing devices such as the clamps 120 with usually smaller width, while reducing the weight of the purlin 110. This arrangement considers both the structural rigidity and the weight of the purlin 110 as a whole, achieving a lightweight design.

In FIGS. 7A-7G and FIG. 8, the width of the second plate 112 and the receiving groove 113 in the central region 114 is reduced from the first width W1 to the second width W2. To further achieve lightweight design, the size of the second plate 112 can be optimized through simulation. Wherein the maximum width of the second plate 112 in the central region 114 is the first width W1, the minimum width is the second width W2, and the length along the first direction X-X' is the first length L1. The preferred range of the ratio W1/W2 is 1.5~3; and the preferred range of the ratio L1/W1 is 2~4.

Figure 8:
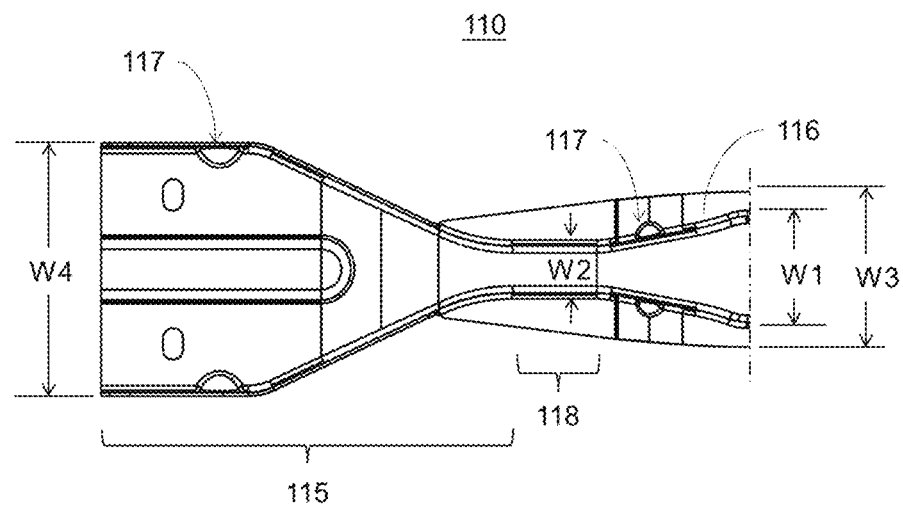
FIG. 8 is a partial top view of the purlin in the embodiment in FIG. 3.

In some preferred embodiments, in FIG. 6A and FIG. 8, the purlin 110 may further include two third plates 116, which respectively extend outward along the second direction Y-Y' from one end of each two first plates 111 away from the second plate 112. The third plate 116 or a portion thereof is located in the central region 114 and is adapted to abut the main shaft 144 to increase the contact area therebetween. In an embodiment where the third plate 116 is not provided, a curling edge may be provided at one end of each two first plates 111 away from the second plate 112 to abut the main shaft 144, or a pressing block or a pressing plate may be provided therebetween to complete the abutment. However, the advantage of providing the third plates 116 is, they can be produced together with the first plates 111 and the second plate 112 through an integrated low-cost stamping part or die-casting part, and can provide better installation stability and fit.

To fit with the main shaft 144, the third plates 116 extend along the second direction Y-Y'. However, the extension direction of other plates, such as the first plates 111, can be more flexible. Although not detailly shown, a technician understands that the first plates 111 or a part thereof may not extend along the third direction Z-Z', by forming a draft angle, which facilitates stamping or die casting, and also improves the overall stability of the structure. Similarly, the second plate 112 extends along the first direction X-X' as a whole, but local regions may have structures like slopes, indentations, and corrugations.

In FIG. 8 and FIG. 21, in some preferred embodiments, the width of the third plate 116 in the second direction Y-Y' gradually decreases from a central position to the two end regions 115. Observed along the third direction Z-Z', the edge of the third plate 116 is in an outwardly convex arc shape. The third direction Z-Z' is perpendicular to the second direction Y-Y' and the second direction Y-Y'. Of course, the edge of the third plate 116 can also adopt one of the profiles shown in FIGS. 7A-7G. This has a benefit that at the central position, which is also the central position of the main shaft 144 in the first direction X-X', the purlin 110 has the largest fitting area with the main shaft 144, thereby achieving better support. The width reduction in the direction of the end regions 115 can reduce the weight of the purlin 110 with little effect on the support effect, and also achieve a smooth change of structural stiffness, realizing a rigid-flexible coupling force transmission, which facilitates stress dispersion and avoids stress concentration.

Figure 6B:
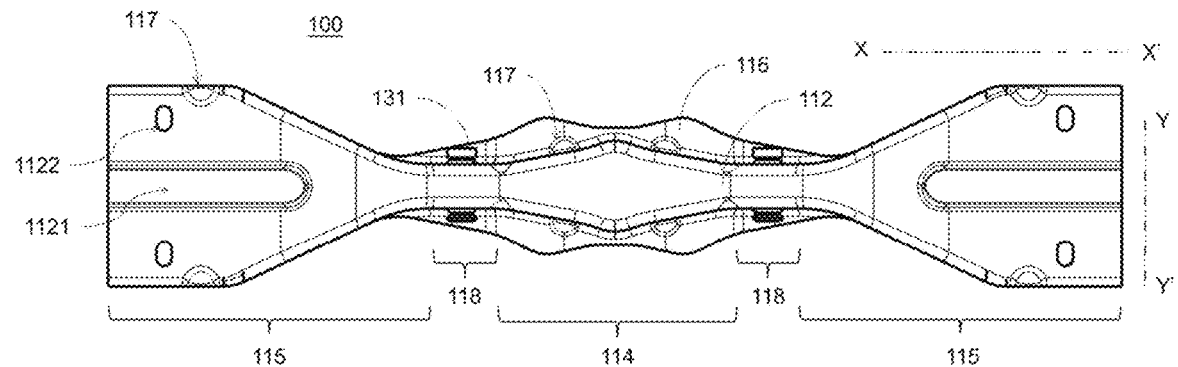
FIG. 6B is a top view of a purlin assembly according to another embodiment.

Of course, in FIG. 6B, in other embodiments, the edge of the third plate 116 may also include a shape consisting of two convex arcs and a concave portion therebetween.

Figure 9:
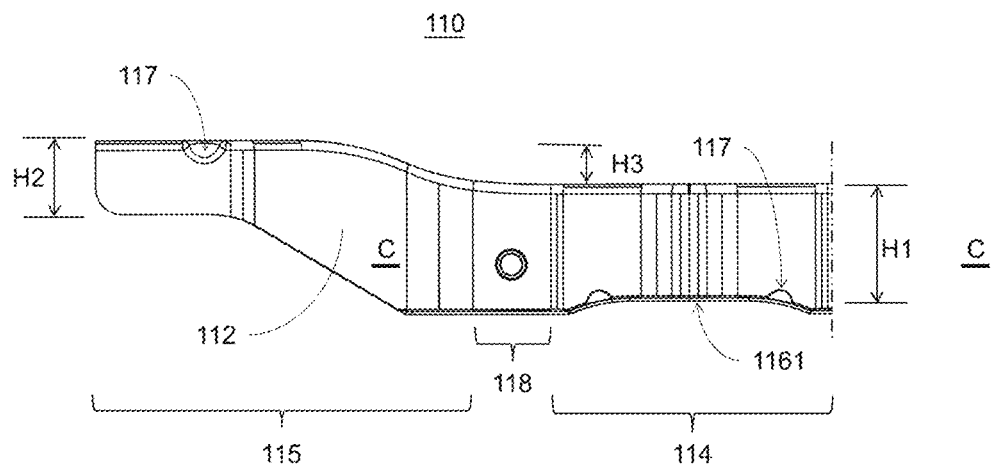
FIG. 9 is a partial front view of the purlin of the embodiment in FIG. 3.
Figure 10:
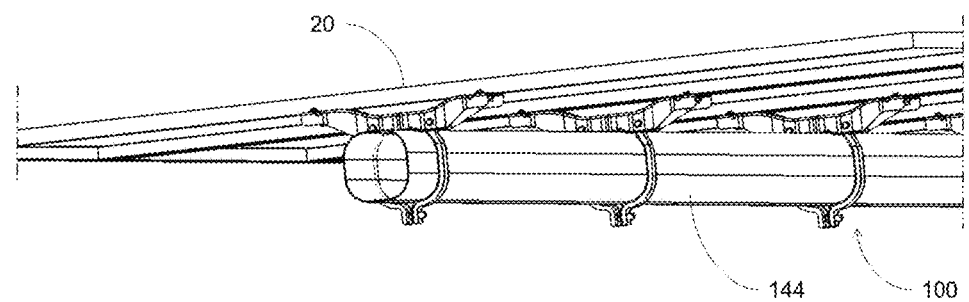
FIG. 10 is a partial perspective view of the embodiment of FIG. 1 from another angle.

In FIG. 9, an abutting surface 1161 of the third plate 116 away from the second plate 112 is at least partially adapted to the outer surface of the main shaft 144. And in FIG. 10, it abuts against the installed main shaft 144. In FIG. 9, in the central region 114, at least one reinforcing rib 117 is provided at the corners formed by each first plate 111 and the corresponding third plate 116. In this embodiment, two reinforcing ribs are symmetrically distributed left and right. Similarly, in the end regions 115, reinforcing ribs 117 can be provided at corners formed by each first plate 111 and the second plate 112. Other similar positions can also be provided with reinforcing ribs 117 as needed to improve local structural rigidity.

In FIG. 8, the maximum width of the third plate 116 is a third width W3. And the third plate 116 also extends through the connecting regions 118 until the end regions 115, and its width gradually decreases to or close to the first width W1. The above arrangement can further enhance overall rigidity of the purlin 110. At the end regions 115 close to their ends, the width of the second plate 112 is the fourth width W4. The fourth width W4 is the maximum width of the purlin 110, resulting in W4>W3>W1>W2. The ratio W4/W1 preferably ranges from 1.5 to 3, and more preferably W4/W1=2 in FIG. 8.

In FIG. 9, in some preferred embodiments, the minimum height of the first plates 111 in the end regions 115 in the third direction Z-Z' is a second height H2, which is less than the minimum height (first height H1) of the first plate 111 in the central region 114. The minimum height is mentioned because these regions do not necessarily have a single height. However, on the whole, the first plates 111 at the central region 114 has a greater height, and the first plates 111 at the end regions 115 has a smaller height. Wherein at two ends of the entire purlin 110, the first plates 111 have a uniform second height H2 over a set length. This has the benefit that the central region 114 has a higher bending stiffness and the end regions 115 a relatively lower bending stiffness, which reduces the overall weight of the purlin 110, and cooperates with the arrangement of the third plates 116 to achieve a rigid-flexible coupled force transmission.

In FIG. 6A, to facilitate and improve the fitting connection with the photovoltaic modules 20, the second plate 112 is provided with two elongated holes 1122 arranged at intervals along the second direction Y-Y' in each end region 115. The second plate 112 is also provided with a groove 1121 extending along the first direction X-X' in each end region 115. The long axes of the elongated holes 1122 meet the tolerance matching requirements. In addition to configurations in the accompanying drawings, the elongated holes 1122 of one end region 115 are along the first direction X-X', and those of the other end region 115 are along the second direction Y-Y'; or, the elongated holes 1122 at one diagonal are along the first direction X-X', and those at the other diagonal are along the second direction Y-Y', to adapt to the tolerance of the mounting structure. The grooves 1121 improve the uniform fit between the second plate 112 and the photovoltaic modules 20, and increase the local rigidity of the second plates 112.

In FIG. 9, in some preferred embodiments, the second plate 112 is recessed toward the first side D in the central region 114 relative to the end regions 115. In the figure, the second plate 112 is recessed downward in the central region 114 as a whole, so that the second plate 112 only abuts against the photovoltaic modules 20 in the end regions 115. The figure shows an embodiment in which the central region 114 is recessed as a whole by a third height H3. This improves the fit between the purlin 110 and the photovoltaic modules as a whole. Because, when the recessed structure is not provided and the purlin 110 has small protrusions in the central region 114 due to manufacturing tolerances, it will cause at least one end region 115 to be poorly fitted. And the end regions 115 are key areas for transmitting torque. Another benefit is that the purlin 110 is overall trapezoidal in structure, and a larger size in the third direction Z-Z' is achieved with the same weight, thereby improving its bending resistance and torque transmission ability. The above effects can be intuitively understood in FIG. 10.

Figure 5:
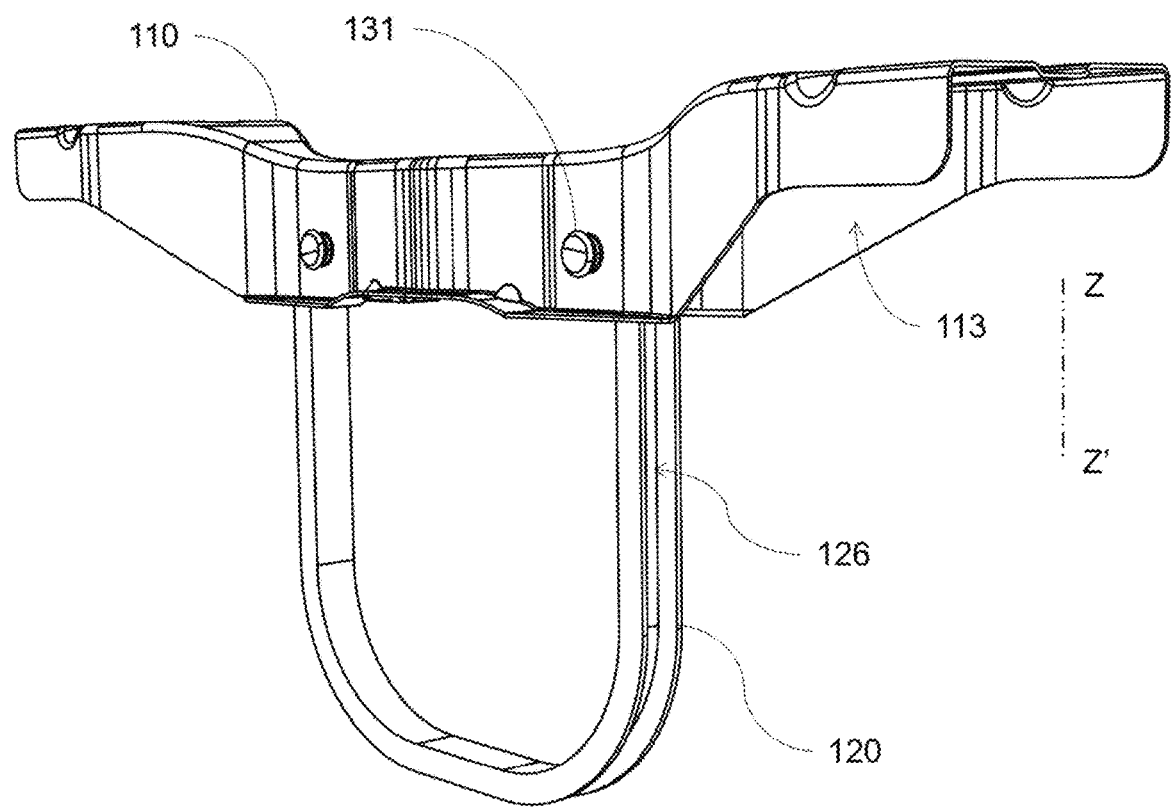
FIG. 5 is a perspective view of another embodiment of a purlin assembly.

The above embodiments of the purlin assembly 100 all include fixing devices, such as the two clamps 120 in FIG. 3, or the single clamp 120 in FIG. 5, or other fixing devices provided in the prior art. However, the purlin assembly 100 of the present application may not include these fixing devices. For example, these fixing devices such as clamps may be pre-mounted on the main shaft 144 and fixed to the purlin 110 during installation. Alternatively, fixing devices such as clamps may be used as separate parts and used to fix the purlin assembly 100 and the main shaft 144 during on-site installation.

Figure 11:
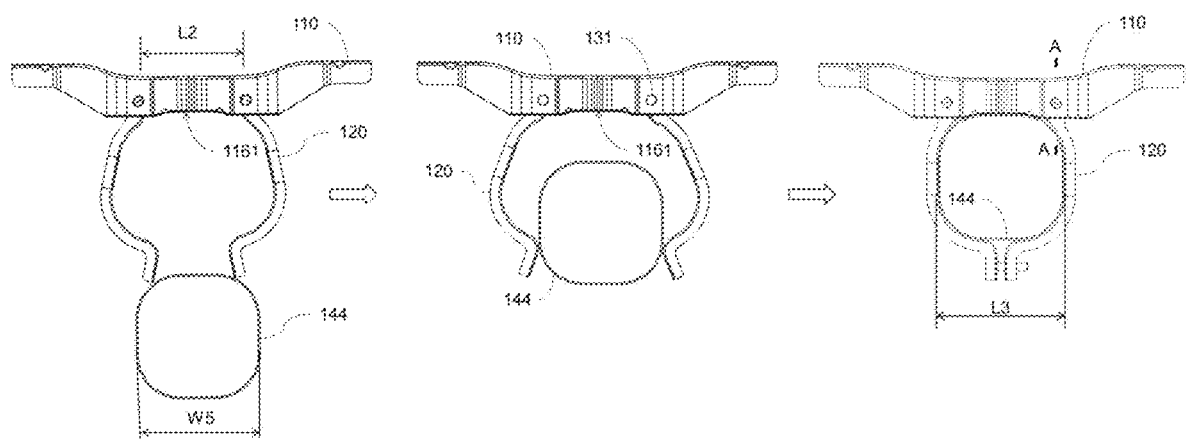
FIG. 11 is a schematic diagram of the embodiment in FIG. 3 fixing to a main shaft.

In a preferred embodiment of the purlin assembly 100 including a fixing device, such as the embodiment of FIG. 3, the fixing device includes two clamps 120, which are located on the first side D of the purlin 110, i.e., the lower side in the figure. The first side D is clearly shown in FIG. 21. The ends of the clamps 120 near the purlin 110 are pivotally arranged on the first plates 111 and spaced apart, so that the two clamps 120 may open and close in respect to each other. In FIG. 11, when the two clamps 120 open, the main shaft 144 can easily enter therebetween, and after the two clamps 120 close, they and a part of the purlin 110 located in the central region 114 including the abutting surface 1161 jointly enclose and fix the main shaft 144.

Referring to FIG. 11 and FIG. 3, in some preferred embodiments, the distance between the pivotal installation positions of the two clamps 120 in the receiving groove 113 is a first distance L2, and the clamps 120 are adapted to enclose and fix a main shaft 144 configured as a torque tube with a square cross-section, the width of which is a fifth width W5. Wherein the range of the first distance L2 is 80% to 100% of the fifth width W5. Preferably, the first distance L2 is set to 90% of the fifth width W5. Firstly, this configuration facilitates the installation process shown in FIG. 11; secondly, it matches the main shaft 144 as a square cross-sectional torque tube, so that the clamps 120 mainly transmit forces at diagonals of the main shaft 144. Whether it is the main shaft 144 or the clamps 120, at these diagonals, due to curved cross-sectional structures, higher rigidity is provided, which facilitates stress reduction and dispersion.

In FIG. 6A and FIG. 8, in some preferred embodiments, the purlin 110 further includes two connecting regions 118, which are respectively arranged between the central region 114 and the two end regions 115. Wherein the ends of the two clamps 120 are respectively pre-installed to the two first plates 111 located in the connecting regions 118 through pivot connectors. In each connecting region 118, the receiving groove 113 has a second width W2, adapted to the proximal width of the clamp 120. Specifically, the second width W2 is slightly larger than the proximal width of the clamp 120, achieving clearance fit to facilitate the rotation of the clamps 120 and installation stiffness. The second width W2 here corresponds to the second width W2 in FIG. 8. For simplicity, the thickness of the first plates 111 is not considered.

Figure 12:
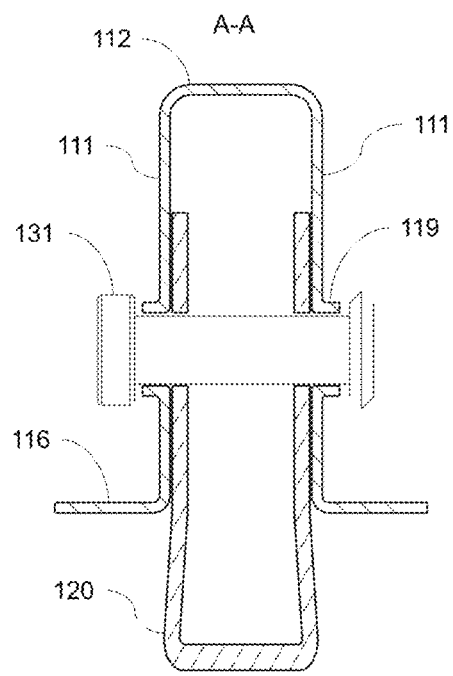
FIG. 12 is an A-A cross-section indicated in FIG. 11 (the pre-installation rivet is not cut).

In FIG. 12, the pivot connection preferably uses a pre-installation rivet 131, and the first plates 111 each have an outwardly protruding flange 119 to enhance local rigidity and provide a rotation bearing for the pre-installation rivet 131. In other embodiments, the above-mentioned connecting region 118 may not be provided, wherein the clamps 120 are pivotally configured to the central region 114 or the end regions 115. For example, a mounting platform extending along the first direction X-X' and the third direction Z-Z' may be stamped on the first plates 111 in these regions for pivotally assembling the clamps 120. The advantage of workshop pre-installation is installation accuracy of the clamps 120 at the pivot connection, and less difficulty of on-site installation.

As mentioned, in some preferred embodiments, in FIG. 3 and FIG. 11, each clamp 120 is pivotally disposed in the receiving groove 113 via a pre-installation rivet 131 so that it can be rotated substantially into the receiving groove 113 for storage and transportation.

In some preferred embodiments, the purlin 110 is integrally stamped. In some embodiments, the two clamps 120 are integrally stamped. This reduces costs and facilitates lightweight design. In other embodiments, the purlin 110 and/or the clamps 120 may be manufactured by thermoforming, die casting, etc.

Figure 13:
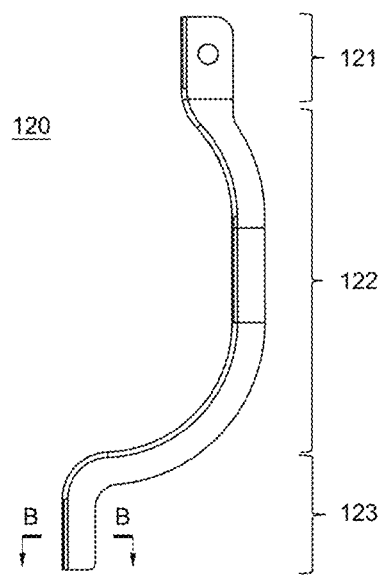
FIG. 13 is a front view of one of the clamps of the embodiment of FIG. 3.

In FIG. 13, in some preferred embodiments, each clamp 120 is a C-shaped structure in whole, and each clamp 120 includes a connecting portion 121, a matching portion 122, and a locking portion 123 sequentially connected along the third direction Z-Z'. The connecting portions 121 of the two clamps 120 are bent oppositely along the first direction X-X' at the same proximal ends, and the connecting portions 121 are pivotally arranged on the first plates 111 through pre-installation rivets 131. The locking portions 123 of the two clamps 120 are bent oppositely along the first direction X-X' at the same distal ends.

In FIG. 11, the distance between the two clamps 120 at the pivotal installation positions at the first plates 111 is a first distance L2. When the two clamps 120 are closed, the maximum distance between the two matching portions 122 is a second distance L3, and the first distance L2 is smaller than the second distance L3. In FIG. 3, the second distance L3 is actually the maximum width of the installation space S in the closed state. And in FIG. 11 and FIG. 19, the second distance L3 matches the maximum width of the main shaft 144, i.e., the fifth width W5. Each connecting portion 121 constitutes the end close to the purlin 110, i.e., the proximal end; and each locking portion 123 constitutes a distal end. One side of each matching portion 122 is adapted to fit against the main shaft 144, i.e., the opposite inner sides shown in FIG. 11. The bolt 132 is secured by the nut 133 after passing through the two locking portions 123, and the purlin assembly 100 is fixed to the main shaft 144.

Figure 14:
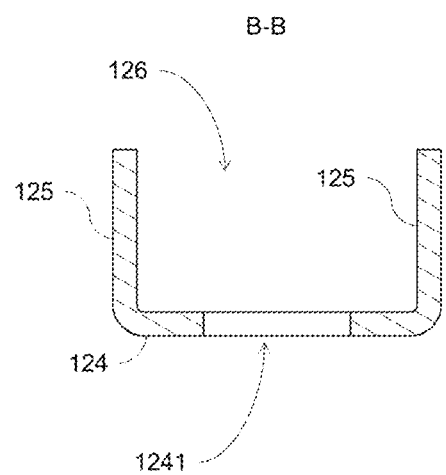
FIG. 14 is a B-B cross-sectional view indicated in FIG. 13 (rotated for easier viewing).

In FIG. 14, in some preferred embodiments, each clamp 120 is a stamped plate, including a bottom wall 124 and two wings 125 arranged on opposite sides of the bottom wall 124, defining an open groove 126. The open grooves 126 of the two clamps 120 are arranged back-to-back. At the locking portions 123, in FIG. 15-16, the two bottom walls 124 are respectively provided with through holes 1241 to pass the bolt 132 and press the clamp 120 and the main shaft 144 together utilizing the nut 133. The head of the bolt 132 and the nut 133 are respectively positioned in the corresponding open groove 126. The positioning of the nut 133 also includes limiting its rotation in the open groove 126. The nut 133 can be a square nut, a hexagonal nut, etc. The bolt 132 may facilitate automated installation, having a hexagonal head or a plum head.

In some preferred embodiments, the nut 133 is a welded nut and is pre-welded to a clamp 120. This facilitates automated installation. Of course, the fasteners can also be standard parts like rivets through the through holes 1241. As mentioned, in FIG. 11, some embodiments only require one bolt 132 to complete the locking. Positioning the head of the bolt 132 and the nut 133 by the open groove 126 facilitates automated installation.

Figure 17:
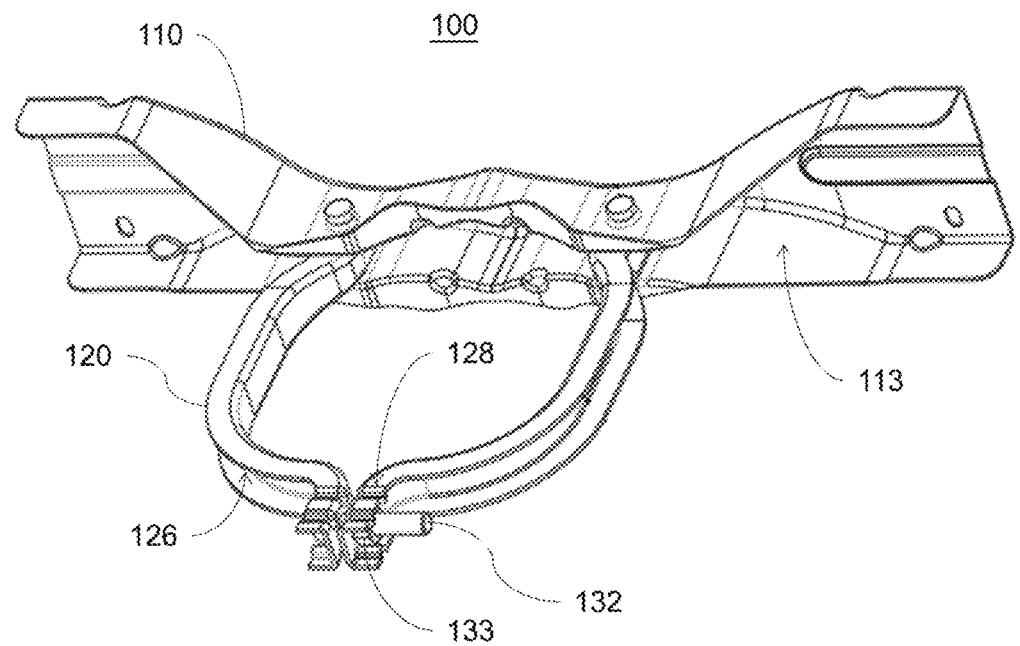
FIG. 17 is a perspective view of another purlin assembly embodiment.
Figure 18A:
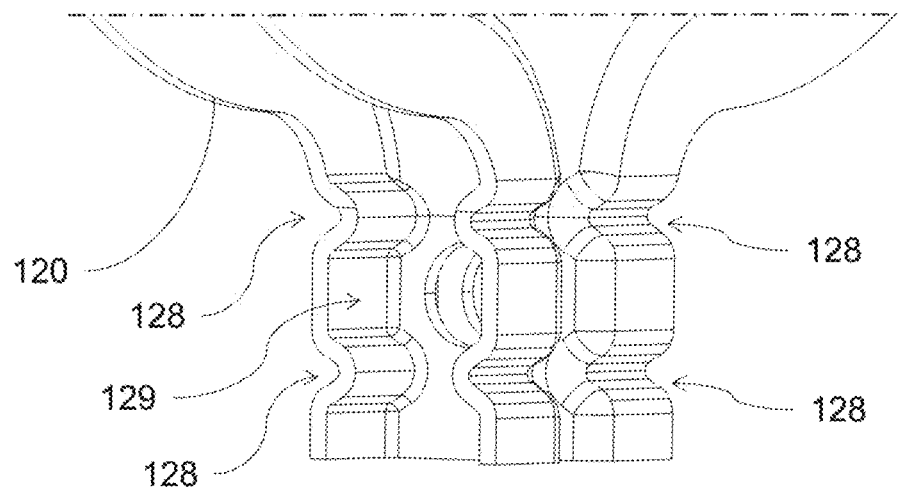
FIG. 18 is a partial perspective view of the clamp in FIG. 17.
FIG. 18B is the clamp in FIG. 18A from another angle after a bolt and a nut are installed.
FIG. 18C is a partial perspective view of the assembly in FIG. 18B from another angle.
Figure 18B:
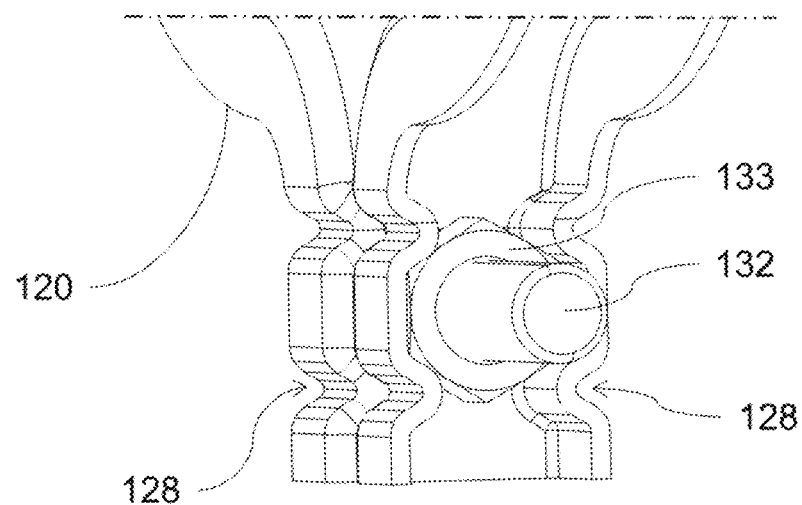
Figure 18C:
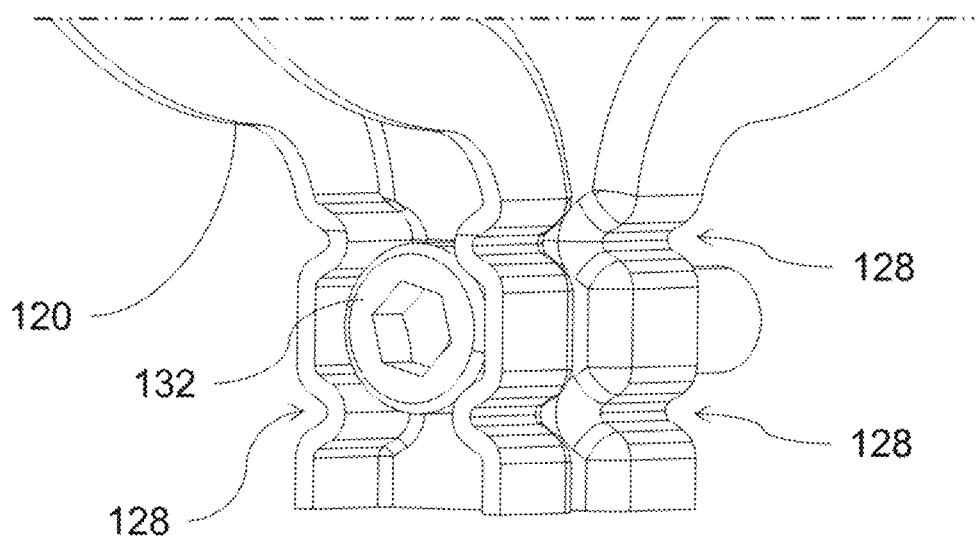

In FIG. 17 and FIG. 18A, in some preferred embodiments, at the locking portion 123 of at least one clamp 120, two groups of contracted portions 128 are arranged at intervals along the extension direction of the clamp 120. The width of the open groove 126 at each group of contracted portions 128 is reduced, to form a positioning cavity 129 therebetween, which limits the nut 133 in the extension direction and width direction of the open groove 126. Each group includes two contracted portions 128 arranged oppositely in the second direction Y-Y', and the two groups form a four-corner distribution to constitute the positioning cavity 129. The contracted portions 128 are stamped in the width direction. In FIG. 18B, when the nut 133 is not welded, the positioning cavity 129 makes it easier and more accurate to be positioned, which facilitates automated installation. Of course, in FIG. 18C, this applies to both clamps 120, facilitating the positioning of the bolt 132 and making two clamps 120 identical, reducing part sorts.

In FIG. 4, the present application also provides a purlin 110 supplied separately, adapted to fix photovoltaic modules 20 to a main shaft 144 with help of a fixing device such as clamps 120 and a fastening set. The specific configuration of the purlin 110 has been described in detail in the above embodiments and are not repeated here.

In FIGS. 1-2, the present application also provides a photovoltaic bracket 10, comprising a plurality of columns 141, a plurality of column top seats 142, a plurality of bearing assemblies 143 and a main shaft 144. The columns 141 are installed one-to-one with the column top seats 142, and the bearing assemblies 143 are installed one-to-one with the column top seats 142. The main shaft 144 passes through the bearing assemblies 143. The photovoltaic bracket 10 also includes a purlin assembly 100 of above embodiments, installed on the main shaft 144 at intervals along its extension direction. Two adjacent purlin assemblies 100 support a photovoltaic module 20.

Figure 19:
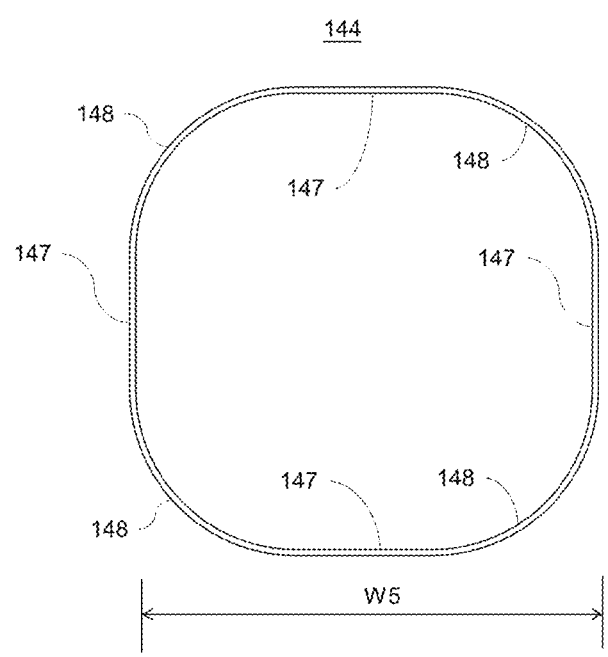
FIG. 19 is a schematic cross-section of the main shaft of the embodiment in FIG. 1.

In FIG. 19, in some preferred embodiments, the main shaft 144 is a square-sectional torque tube, specifically a square-sectional rectangular tube with rounded corners. As mentioned, a square section with rounded corners should also be considered a square section. The cross-section of the main shaft 144 includes four identical plane segments 147 and four identical arc segments 148. The plane segments 147 and the arc segments 148 are alternately arranged in sequence circumferentially. Each clamp 120 of the purlin assembly 100 is respectively adapted to match at least two adjacent arc segments 148 and a plane segment 147 therebetween. In FIG. 11, in some embodiments, each clamp 120 also matches a portion of another plane segment 147 in FIG. 19.

Figure 20:
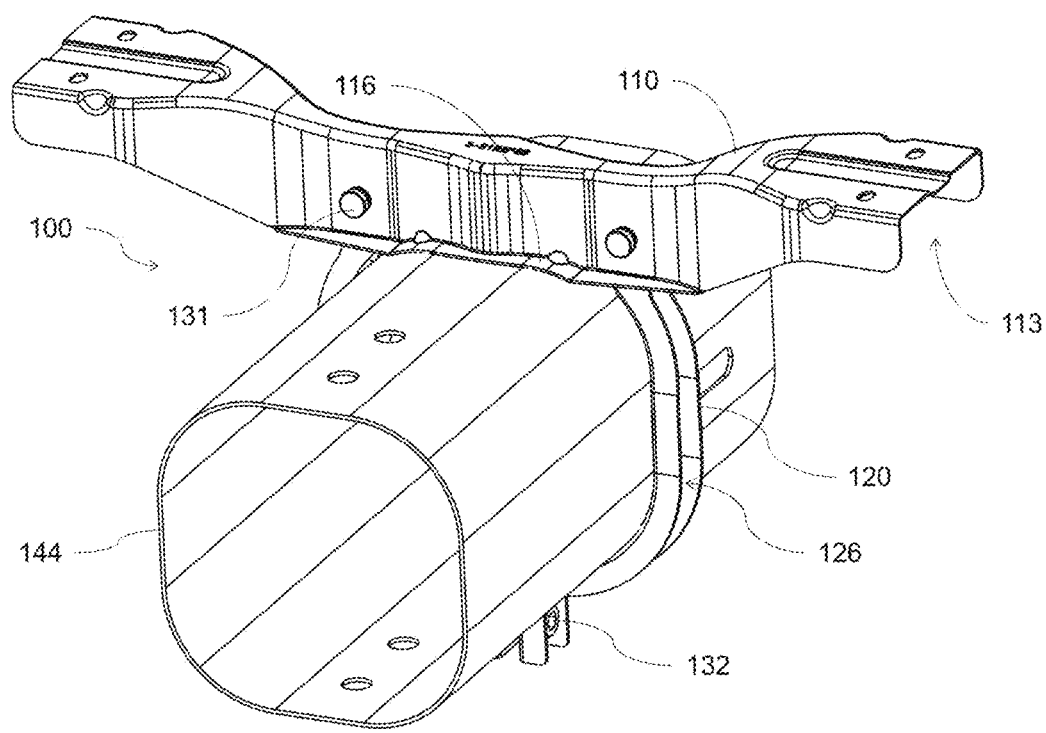
FIG. 20 is a schematic perspective view of the embodiment in FIG. 3 after being connected to the main shaft.

As explained, a rectangular tube with a square cross-section and the arrangement of each clamp 120 matching at least two arc segments 148 facilitate torque transmission and stress reduction. In FIG. 20 (main shaft 144 partly shown), after installation, when the main shaft 144 drives the purlin assembly 100 and then drives the photovoltaic modules 20 (not shown in the figure), the torque is mainly transmitted to the clamps 120 through diagonal positions of the main shaft 144. The clamps 120 transmits the torque to the connecting regions 118 of the purlin 110. The purlin 110 transmits the torque to the photovoltaic modules 20 through the end regions 115 with larger areas. Other structural arrangements, such as the convex arrangement of the central region 114 and the third plates 116, all play a role in increasing structural rigidity and reducing peak stress.

In other embodiments, the cross-section of the main shaft 144 may also be rectangle, or polygons other than a triangle or rectangle, such as pentagon or hexagon, both of which may include rounded corners. And a special-shaped cross-section may also be adopted.

The above are only preferred embodiments of the present application and the technical principles. Various obvious changes, readjustments and substitutions can be made without departing from the concept of the present application. Technicians can easily understand other advantages and effects of the present application from the content disclosed in this specification. The present application can also be implemented or applied through other different specific implementation methods, and the details in this specification can also be modified or changed in various ways based on different viewpoints and applications without departing from the spirit of the present application. In the absence of conflict, the above embodiments and the features in the embodiments can be combined with each other.

The invention claimed is:

1. A purlin assembly (100), characterized by comprising:
   a purlin (110), comprising two first plates (111), a second plate (112), and two third plates (116), wherein the second plate (112) extends as a whole along a first direction (X-X') with width in a second direction (Y-Y'), and the two first plates (111) extend respectively from two edges of the second plate (112) in the second direction (Y-Y') toward a first side (D) of the second plate (112), thereby forming a receiving groove (113) together with the second plate (112), wherein the second plate (112) is adapted to connect with photovoltaic modules (20); and wherein the two third plates (116) extend outwards along the second direction (Y-Y') respectively from two ends of the first plates (111) away from the second plate (112);
   and a fixing device, with one end close to the purlin (110) disposed in the receiving groove (113), and adapted to enclose and fix a main shaft (144) together with at least a portion of the purlin (110);
   wherein, the purlin (110) comprises a central region (114) and two end regions (115) located on opposite sides of the central region (114) along the first direction (X-X'); and in the central region (114), the second plate (112) forms a convex shape wider at a center than at opposite ends, and in a cross-section parallel to the first direction (X-X') and the second direction (Y-Y'), the two first plates (111) also form a convex shape wider at a center than at opposite ends;
   and wherein each third plate (116) is at least partially located in the central region (114) and is adapted to abut against the main shaft (144) to increase a contact area between the purlin (110) and the main shaft (144).

2. The purlin assembly (100) according to claim 1, characterized in that:
   in the central region (114), an overall shape of the second plate (112) is configured as one of: a truncated shuttle, a truncated rhombus, a truncated ellipse, a rectangle with trapezoidal narrowing at opposite ends, a barrel with convex arc contours on sides, a capsule with truncated ends, a disc with Gaussian curves on sides, and a composite convex shape with secondary protrusions on sides;
   and in the central region (114), a maximum width of the second plate (112) is a first width (W1), and a minimum width is a second width (W2), and a length along the first direction (X-X') is a first length (L1), wherein a ratio W1/W2 of the first width (W1) to the second width (W2) is in a range of 1.5-3, and a ratio L1/W1 of the first length (L1) to the first width (W1) is in a range of 2-4.

3. The purlin assembly (100) according to claim 1, characterized in that:
   a width of the third plate (116) in the second direction (Y-Y') gradually decreases from a central position toward the two end regions (115), and when viewed along the third direction (Z-Z'), each edge of the third plate (116) is an outwardly convex arc, wherein the third direction (Z-Z') is perpendicular to the first direction (X-X') and the second direction (Y-Y');
   an abutting surface (1161) of the third plate (116) away from the second plate (112) is adapted to an outer surface of the main shaft (144), and abuts against the main shaft (144) after the main shaft (144) is installed.

4. The purlin assembly (100) according to claim 3, characterized in that:
the first plates (111) in the end regions (115) have a second height (H2) in the third direction (Z-Z'), and a minimum height of the first plate (111) in the central region (114) is a first height (H1), wherein the first height (H1) is greater than the second height (H2);
and in each end region (115), the second plate (112) is provided with two elongated holes (1122) arranged at intervals along the second direction (Y-Y').

5. The purlin assembly (100) according to claim 1, characterized in that:
the second plate (112) is recessed toward the first side (D) in the central region (114) relative to the end regions (115), so that the second plate (112) abuts against the photovoltaic modules (20) only at the end regions (115);
and the second plate (112) is provided with a groove (1121) extending along the first direction (X-X') at each end region (115).

6. The purlin assembly (100) according to claim 1, characterized in that:
the fixing device comprises two clamps (120), wherein ends of the clamps (120) close to the purlin (110) are pivotally arranged on the first plates (111) and spaced apart, so that the two clamps (120) are adapted to open and close in respect to each other.

7. The purlin assembly (100) according to claim 6, characterized in that:
the purlin (110) further comprises two connecting regions (118), which are respectively arranged between the central region (114) and the two end regions (115);
and the ends of the two clamps (120) are respectively pre-installed at the connecting regions (118) of the first plates (111) via pivot connectors.

8. The purlin assembly (100) according to claim 6, characterized in that:
each of the clamps (120) has a C-shaped structure in whole, comprising a connecting portion (121), a matching portion (122), and a locking portion (123), which are sequentially connected along a third direction (Z-Z');
and the connecting portions (121) of the two clamps (120) are bent relative to each other along the first direction (X-X') at a same end, and the connecting portions (121) are pivotally arranged on the first plates (111) via pre-installation rivets (131); and the locking portions (123) of the two clamps (120) are bent relative to each other along the first direction (X-X') at a same end;
and a distance between the two clamps (120) at pivotal installation positions at the first plates (111) is a first distance (L2); and in a closed state, a maximum distance between the two matching portions (122) is a second distance (L3); wherein the first distance (L2) is smaller than the second distance (L3).

9. The purlin assembly (100) according to claim 8, characterized by further comprising
a fastening set, which comprises a bolt (132) and a nut (133), and when the bolt (132) passes through the two locking portions (123), and secured by the nut (133), the purlin assembly (100) is fixed to the main shaft (144).

10. The purlin assembly (100) according to claim 9, characterized in that:
each of the clamps (120) comprises a bottom wall (124) and two wings (125) arranged on opposite sides of the bottom wall (124); wherein the bottom wall (124) and the two wings (125) define an open groove (126), and the open grooves (126) of the two clamps (120) are arranged back-to-back;
and at the locking portions (123), the two bottom walls (124) are respectively provided with a through hole (1241) for passing the bolt (132) therethrough, and in combination with the nut (133), the clamps (120) and the main shaft (144) are pressed and fixed together; wherein a head of the bolt (132) and the nut (133) are respectively positioned in a corresponding open groove (126).

11. The purlin assembly (100) according to claim 10, characterized in that:
the locking portion (123) of at least one of the clamps (120) is provided with two groups of contracted portions (128) spaced apart along an extension direction of the clamp (120), and a width of the open groove (126) at each group of contracted portions (128) is reduced, so that a positioning cavity (129) is formed between the two groups of contracted portions (128), and the positioning cavity (129) is adapted to limit a position of the nut (133) in an extension direction and in a width direction of the open groove (126).

12. A purlin (110) for fixing photovoltaic modules (20) to a main shaft (144), characterized by comprising
two first plates (111), a second plate (112), and two third plates (116);
wherein the second plate (112) extends in whole along a first direction (X-X') with width in a second direction (Y-Y'), and the two first plates (111) extend respectively from two edges of the second plate (112) in the second direction (Y-Y') toward a first side (D) of the second plate (112), thereby forming a receiving groove (113) together with the second plate (112), wherein the second plate (112) is adapted to connect with photovoltaic modules (20);
and the receiving groove (113) is adapted to arrange an end of a fixing device close to the purlin (110), so that a part of the purlin (110) and the fixing device jointly enclose and fix the main shaft (144);
and the purlin (110) comprises a central region (114) and two end regions (115) located on opposite sides of the central region (114) along the first direction (X-X'); and in the central region (114), the second plate (112) forms a convex shape wider at a center than at opposite ends, and in a cross-section parallel to the first direction (X-X') and the second direction (Y-Y'), the two first plates (111) also form a convex shape wider at a center than at opposite ends;
and the two third plates (116) extend outwards along the second direction (Y-Y') respectively from two ends of the first plates (111) away from the second plate (112); and each third plate (116) is at least partially located in the central region (114) and is adapted to abut against the main shaft (144) to increase a contact area between the purlin (110) and the main shaft (144).

13. A photovoltaic bracket (10), comprising a plurality of columns (141), a plurality of column top seats (142), a plurality of bearing assemblies (143) and a main shaft (144), wherein the plurality of columns (141) are installed in a one-to-one correspondence with the plurality of column top seats (142), and the plurality of bearing assemblies (143) are installed in a one-to-one correspondence with the plurality of column top seats (142), and the main shaft (144) passes through the plurality of bearing assemblies (143), characterized by further comprising:

a plurality of purlin assemblies (100) installed on the main shaft (144) at intervals along an extension direction of the main shaft (144), and two adjacent purlin assemblies (100) are used to support a photovoltaic module (20);

wherein each of the purlin assemblies (100) comprises:

a purlin (110), comprising two first plates (111), a second plate (112), and two third plates (116), wherein the second plate (112) extends as a whole along a first direction (X-X') with width in a second direction (Y-Y'), and the two first plates (111) extend respectively from two edges of the second plate (112) in the second direction (Y-Y') toward a first side (D) of the second plate (112), thereby forming a receiving groove (113) together with the second plate (112), wherein the second plate (112) is adapted to connect with photovoltaic modules (20); and wherein the two third plates (116) extend outwards along the second direction (Y-Y') respectively from two ends of the first plates (111) away from the second plate (112);

and a fixing device, with one end close to the purlin (110) disposed in the receiving groove (113), and adapted to enclose and fix a main shaft (144) together with at least a portion of the purlin (110);

wherein, the purlin (110) comprises a central region (114) and two end regions (115) located on opposite sides of the central region (114) along the first direction (X-X'); and in the central region (114), the second plate (112) forms a convex shape wider at a center than at opposite ends, and in a cross-section parallel to the first direction (X-X') and the second direction (Y-Y'), the two first plates (111) also form a convex shape wider at a center than at opposite ends;

and wherein each third plate (116) is at least partially located in the central region (114) and is adapted to abut against the main shaft (144) to increase a contact area between the purlin (110) and the main shaft (144).

14. The photovoltaic bracket (10) according to claim 13, characterized in that:

the main shaft (144) is a square-sectional torque tube, and a cross-section of the main shaft (144) comprises four identical plane segments (147) and four identical arc segments (148), and the four plane segments (147) and the four arc segments (148) are alternately arranged in sequence along circumferentially;

and the fixing device comprises two clamps (120), wherein ends of the clamps (120) close to the purlin (110) are pivotally arranged on the first plates (111) and spaced apart, so that the two clamps (120) are adapted to open and close in respect to each other; and each clamp (120) of the two clamps (120) is adapted to match at least two adjacent arc segments (148) and one of the plane segments (147) therebetween.

15. The photovoltaic bracket (10) according to claim 13, characterized in that:

in the central region (114), an overall shape of the second plate (112) is configured as one of: a truncated shuttle, a truncated rhombus, a truncated ellipse, a rectangle with trapezoidal narrowing at opposite ends, a barrel with convex arc contours on sides, a capsule with truncated ends, a disc with Gaussian curves on sides, and a composite convex shape with secondary protrusions on sides;

and in the central region (114), a maximum width of the second plate (112) is a first width (W1), and a minimum width is a second width (W2), and a length along the first direction (X-X') is a first length (L1), wherein a ratio W1/W2 of the first width (W1) to the second width (W2) is in a range of 1.5-3, and a ratio L1/W1 of the first length (L1) to the first width (W1) is in a range of 2-4.

16. The photovoltaic bracket (10) according to claim 13, characterized in that, a width of the third plate (116) in the second direction (Y-Y') gradually decreases from a central position toward the two end regions (115), and when viewed along the third direction (Z-Z'), each edge of the third plate (116) is an outwardly convex arc, wherein the third direction (Z-Z') is perpendicular to the first direction (X-X') and the second direction (Y-Y'); and the second plate (112) is recessed toward the first side (D) in the central region (114) relative to the end regions (115), so that the second plate (112) abuts against the photovoltaic modules (20) only at the end regions (115);

and the second plate (112) is provided with a groove (1121) extending along the first direction (X-X') at each end region (115).

17. The photovoltaic bracket (10) according to claim 16, characterized by further comprising a fastening set, which comprises a bolt (132) and a nut (133), and when the bolt (132) passes through the two locking portions (123), and secured by the nut (133), the purlin assembly (100) is fixed to the main shaft (144).

18. The photovoltaic bracket (10) according to claim 13, characterized in that, the fixing device comprises two clamps (120), wherein ends of the clamps (120) close to the purlin (110) are pivotally arranged on the first plates (111) and spaced apart, so that the two clamps (120) are adapted to open and close in respect to each other; and the purlin (110) further comprises two connecting regions (118), which are respectively arranged between the central region (114) and the two end regions (115);

and the ends of the two clamps (120) are respectively pre-installed at the connecting regions (118) of the first plates (111) via pivot connectors;

and each of the clamps (120) comprises a connecting portion (121), a matching portion (122), and a locking portion (123), which are sequentially connected along a third direction (Z-Z');

and the connecting portions (121) of the two clamps (120) are bent relative to each other along the first direction (X-X') at a same end, and the connecting portions (121) are pivotally arranged on the first plates (111) via pre-installation rivets (131); and the locking portions (123) of the two clamps (120) are bent relative to each other along the first direction (X-X') at a same end;

and a distance between the two clamps (120) at pivotal installation positions at the first plates (111) is a first distance (L2); and in a closed state, a maximum distance between the two matching portions (122) is a second distance (L3); wherein the first distance (L2) is smaller than the second distance (L3).

19. The photovoltaic bracket (10) according to claim 18, characterized in that, each of the clamps (120) has a C-shaped structure in whole, and comprises a bottom wall (124) and two wings (125) arranged on opposite sides of the bottom wall (124); wherein the bottom wall (124) and the two wings (125) define an open groove (126), and the open grooves (126) of the two clamps (120) are arranged back-to-back;

and at the locking portions (123), the two bottom walls (124) are respectively provided with a through hole (1241) for passing the bolt (132) therethrough, and in combination with the nut (133), the clamps (120) and the main shaft (144) are pressed and fixed together; wherein a head of the bolt (132) and the nut (133) are respectively positioned in a corresponding open groove (126);

and the locking portion (123) of at least one of the clamps (120) is provided with two groups of contracted portions (128) spaced apart along an extension direction of the clamp (120), and a width of the open groove (126) at each group of contracted portions (128) is reduced, so that a positioning cavity (129) is formed between the two groups of contracted portions (128), and the positioning cavity (129) is adapted to limit a position of the nut (133) in an extension direction and in a width direction of the open groove (126).

\* \* \* \* \*